US010288222B2

(12) United States Patent
Sinding

(10) Patent No.: US 10,288,222 B2
(45) Date of Patent: May 14, 2019

(54) METHOD OF REFUELING A HYDROGEN VEHICLE

(71) Applicant: Nel Hydrogen A/S, Herning (DK)

(72) Inventor: Claus Due Sinding, Herning (DK)

(73) Assignee: NEL HYDROGEN A/S, Herning (DK)

(*) Notice: Subject to any disclaimer, the term of this patent is extended or adjusted under 35 U.S.C. 154(b) by 16 days.

(21) Appl. No.: 15/724,715

(22) Filed: Oct. 4, 2017

(65) Prior Publication Data
US 2018/0335181 A1 Nov. 22, 2018

(30) Foreign Application Priority Data
May 22, 2017 (DK) ................................ 2017 70360

(51) Int. Cl.
F17C 5/04 (2006.01)
F17C 13/02 (2006.01)

(52) U.S. Cl.
CPC .............. F17C 5/04 (2013.01); F17C 13/025 (2013.01); F17C 13/026 (2013.01); F17C 2205/0326 (2013.01); F17C 2205/0338 (2013.01); F17C 2221/012 (2013.01); F17C 2223/036 (2013.01); F17C 2250/043 (2013.01); F17C 2250/0439 (2013.01); F17C 2250/0636 (2013.01); F17C 2250/072 (2013.01); F17C 2265/065 (2013.01); F17C 2270/0139 (2013.01); F17C 2270/0168 (2013.01); F17C 2270/0184 (2013.01)

(58) Field of Classification Search
CPC ........ F17C 5/04; F17C 13/025; F17C 13/026; F17C 2205/0326; F17C 2205/0338; F17C 2250/043; F17C 2250/0439; F17C 2250/0636; F17C 2250/072

USPC ........................................................... 141/95
See application file for complete search history.

(56) References Cited

U.S. PATENT DOCUMENTS

2005/0178463 A1* 8/2005 Kountz ..................... F17C 9/02
141/4
2007/0257043 A1* 11/2007 Kanoya ..................... F17C 5/06
220/581
2010/0307636 A1* 12/2010 Uemura ..................... F17C 5/06
141/4

(Continued)

FOREIGN PATENT DOCUMENTS

EP 1336795 A2 8/2003
JP 2015169325 A 9/2015

(Continued)

Primary Examiner — Andrew D StClair
(74) Attorney, Agent, or Firm — Cantor Colburn LLP

(57) ABSTRACT

A method of refueling a vehicle tank with hydrogen, the refueling is controlled by a refueling station controller, the method including: connecting the tank to the station, initiating the refueling process, during the refueling monitoring the temperature of the gas inside the tank, establishing a pressure stop criterion for the refueling, based on a pressure category of the tank and the monitored temperature of the gas, the establishing of the pressure stop criterion being based on a lookup in a predefined table of a plurality of pressure stop criteria, during the refueling monitoring the pressure of the gas inside the tank, by the controller comparing the pressure of the gas with the pressure stop criterion and terminating the refueling when the pressure of the gas inside the tank has reached the pressure stop criterion, and disconnecting the vehicle and the refueling station.

17 Claims, 4 Drawing Sheets

(56) References Cited

U.S. PATENT DOCUMENTS

| | | | |
|---|---|---|---|
| 2013/0197777 A1* | 8/2013 | Sloan | G01F 23/18 |
| | | | 701/102 |
| 2013/0202988 A1 | 8/2013 | Wang | |
| 2014/0202584 A1* | 7/2014 | Mathison | F17C 5/007 |
| | | | 141/4 |
| 2014/0290790 A1* | 10/2014 | Mathison | F17C 5/06 |
| | | | 141/4 |
| 2015/0377416 A1* | 12/2015 | Miyoshi | F17C 5/06 |
| | | | 141/95 |
| 2016/0273710 A1 | 9/2016 | Wistoft-Ibsen | |
| 2017/0130901 A1* | 5/2017 | Sloan | F17C 5/06 |

FOREIGN PATENT DOCUMENTS

| | | |
|---|---|---|
| WO | 2014150320 A1 | 9/2014 |
| WO | 2014200959 A2 | 12/2014 |

\* cited by examiner

METHOD OF REFUELING A HYDROGEN VEHICLE

CROSS REFERENCE TO RELATED APPLICATION

This application is related to and claims the benefit of Danish Patent Application Number PA 2017 70360 filed on May 22, 2017, the contents of which are herein incorporated by reference in their entirety.

TECHNICAL FIELD

The present invention relates to a method of refueling a hydrogen vehicle.

BACKGROUND

Refueling of a hydrogen vehicle is basically concerned with how the refueling can performed safely and without over-fueling the vehicle tank.

One method is described in SAE J2601 directing how a refueling can be safely executed without the risk of over-fueling the vehicle tank.

Various methods known within the art may be attempted adapted to comply with the above standard. One such method is described in EP1336795. Here an electric controller has knowledge of the rated density of a full vehicle tank, knowledge which is obtained from the manufacture of the tank. The electric controller is then periodically during the refueling, based on temperature and pressure signals from inside the tank, calculating the density in the receiving tank. When the calculated density is less than the tank rated density a flow is allowed to the tank and when the calculated density is higher than the tank rated density the flow is discontinued. When the density in the tank is equal to or higher than the rated density, the electric controller wait for the instrument to settle and if the density is still above rated density the refueling is complete. If not, the refueling is again resumed. In this way over time, the calculated density equals the tank rated density resulting in a full receiving tank.

The prior art including EP1336795 suffers from drawbacks that e.g. information is needed of the vehicle tank design and that calculation of density during the refueling process is required.

BRIEF SUMMARY

A method is provided of determining when a vehicle tank is full without prior knowledge of the vehicle tank design and without the need of any calculations of density during the refueling.

The invention relates to a method of refueling a vehicle tank with hydrogen, the refueling process is controlled by a hydrogen refueling station controller, the method comprising the steps of: connecting the vehicle to the hydrogen refueling station by means of a hose, initiating the refueling process by activating the controller, during the refueling process monitoring the temperature of the gas inside the vehicle tank, the controller establishing a pressure stop criterion for the refueling process, based on a pressure category of the vehicle tank and the monitored temperature of the gas inside the vehicle tank, the establishing of the pressure stop criterion being based on a lookup in a predefined table of a plurality of pressure stop criteria, during the refueling process monitoring the pressure of the gas inside the vehicle tank, by the controller comparing the monitored pressure of the gas inside the vehicle tank with the pressure stop criterion and terminating the refueling process when the monitored pressure of the gas inside the vehicle tank has reached the pressure stop criterion, and disconnecting the hose between vehicle and the hydrogen refueling station.

This is advantageous over prior art in that only pressure category of the vehicle tank and temperature of the gas inside the vehicle tank is needed to determine a pressure stop criterion. This is because the thermodynamic properties of hydrogen is used to determine data sets of a predefined table hence no calculation is necessary during the refueling process.

This alternative to the known methods is both simpler and more reliable in that only a lookup in a predefined table, based on measured temperature of gas inside the vehicle tank is used.

However, since there are no calculations of density in the vehicle tank during the refueling process, the above method cannot during a refueling process provide this information to the user.

The hydrogen refueling station controller is also in this document sometimes simply referred to as controller. The controller is preferably located in the center module of the hydrogen refueling station, but may also be located in the dispenser. The hydrogen refueling station is also sometimes referred to simply as station.

The establishing of pressure stop criterion and comparison of vehicle tank pressure with the refueling stop pressure is preferably made by the controller.

Vehicle tank temperature is preferably the temperature of the hydrogen within the tank, but could also if this is not possible to determine be the temperature of the physical tank which due to its thermal conductivity by related to the temperature of the hydrogen within.

A plurality of pressure stop criterion are preferably established prior to the beginning of the refueling process and stored in a memory, database, table or the like. Then, based on the measured vehicle tank temperature the pressure stop criterion can be found in real time from a lookup in the previously made calculations of the memory.

It should be mentioned, that the sequence of the steps of the method may be different from the what is described above. Hence, e.g. it is possible to establish temperature and pressure of gas in vehicle tank at the same time.

The present invention is advantageous in that the pressure stop criterion can be determined fast and precise without any calculations made during the refueling process.

According to an embodiment of the invention, an upper limit of the pressure stop criterion is 102%, preferably 101%, most preferably 100% of the pressure stop criterion.

The pressure stop criterion is preferably an interval ranging from an upper limit to a lower limit. In relation to safety the upper limit is the most important in that exceeding this may lead to a risk of mechanical damage of the hydrogen supply lines, vehicle tank, sensors, etc. and create a hazardous situation. It is preferred to terminate the refueling when the pressure stop criterion is reached or at least before 105% of the pressure stop criterion is reached to avoid hazardous situations.

The lower limit on the other hand is determined by the minimum amount of hydrogen which is refueled into the vehicle tank. Hence the lower limit is preferably close to (e.g. higher than 80% of the pressure stop criterion e.g. at least 95%) or equal to the pressure stop criterion, however situations may occur where the refueling is terminated before the pressure stop criterion is reached. Examples of such a situation could be to reduce the time a refueling takes, terminate refueling when the cost of hydrogen in the vehicle tank has reached an amount, communication between vehicle and station is lost, etc.

The range of the pressure stop criterion interval may be dynamic e.g. determined by the slope of the average pressure ramp rate. Hence, if the slope is high the ramp rate is steep, then the lower limit may be lowered compared to the situation where the slope low. This is advantageous in that the flow of hydrogen from station to vehicle is/can be reduce in the last part of the refueling i.e. from when the lower limit of the pressure stop criterion interval is reached. Thereby is obtained more precise measurements of especially pressure which may lead to a more precise determination of the amount of hydrogen in the vehicle tank and thereby also the cost hereof.

Another determining factor of the pressure stop criterion can be the response time from the controller communicate to a valve to close to the valve is actually closed. The faster response time the more narrow the range of the pressure stop criterion interval can be. In any case, it is preferred that the valve is closed and thereby the refueling process is terminated within 10 seconds preferably no later than 5 seconds from when Pvehicle≥Pstop.

According to an embodiment of the invention, the controller is activated by at least one of the list comprising: approaching vehicle, activation of user interface and initiating payment. The activation of the controller is understood as the action performed either by any user, any mechanical or any electric device leading to the control program execute by the controller is leaving a stand by state for entering a refueling routine.

Activation of the controller can be done by lifting nozzle from dispenser, interaction with user interface of hydrogen refueling station or similar initial steps made when starting a refueling process.

According to an embodiment of the invention, the pressure category for the vehicle tank to be refueled is determined prior to activation of the controller.

Early and especially valid (trusted) determination of pressure category is advantageous in that then this parameter cannot cause error in the determination of the pressure stop criterion. One way of knowing the pressure category of a vehicle tank is by mechanical adaptation between nozzle and receptacle of vehicle so than if the nozzle fits the receptacle e.g. the vehicle tank can only be rated at a 700 bar Alternatively, the determination of pressure category can be made by receiving communication hereof from the vehicle. In most cases, this would be after activation of the controller or part of the activation of the controller.

The pressure category is determining for which predetermined table the pressure stop criterion is found.

According to an embodiment of the invention, information of vehicle tank temperature and vehicle tank pressure is provided to the controller at least every third second, preferably ever second and most preferably every 10 ms.

This information is preferably provided via sensors measuring temperature and pressure in or at the vehicle tank. These sensors may communicate directly with the controller or through a vehicle controller. Since the establishing of stop pressure cannot be faster than the frequency of the update of vehicle tank pressure and temperature, this frequency determines how close the vehicle tank pressure can be to the stop pressure when the controller stops the refueling process.

According to an embodiment of the invention, density of the hydrogen in the vehicle tank is calculated based on information of vehicle tank temperature and vehicle tank pressure obtained after termination of the refueling process.

This is advantageous in that then the quantity of hydrogen in the vehicle can be displayed to the user of the hydrogen refueling station or driver of the hydrogen vehicle which in many situations is the same person.

Also this is advantageous in that post refueling density calculations can be used for determining the amount of hydrogen delivered to the vehicle tank and thereby the amount to be paid for the delivered amount of hydrogen.

According to an embodiment of the invention, the predefined table for at least one pressure category comprising a plurality of (gas temperature, pressure stop criterion) dataset. A table based approach is advantageous in that it is faster to determine a pressure stop criterion from a table look-up than from a calculation of a pressure stop criterion. Faster establishment of stop criterion leads to faster response to safety related issues and thereby increase the possibilities of stopping a potential safety threat before it emerges.

The disadvantage of the table based approach is that dataset cannot connect any gas temperatures to a pressure stop criterion. Hence depending on the resolution of the table larger or minor gaps will exist where a precise dataset cannot be established. However, it has turned out that interpolation between dataset of the predefined table is sufficient to establish missing pressure stop criteria. Such interpolation can be made during the refueling procedure, however it is preferred that the predefined table is large enough to hold datasets enough to avoid the interpolation in that interpolation introduces calculations taking time to execute.

It is advantageous to calculate the data set of vehicle temperature and pressure stop criterion for one or more pressure categories prior to the refueling process start, preferably prior to commissioning of the station in that then no processor capacity of the station controller during the refueling process is needed to perform these calculations.

According to an embodiment of the invention, the pressure stop criterion for a 700 bar vehicle tank is determined based on the following equation:

$$P_{stop} = 2.5 \frac{\text{bar}}{^\circ\text{C.}} \cdot T_{Vehicle} + 661.6 \text{ bar}$$

According to an embodiment of the invention, the pressure stop criterion for a 350 bar vehicle tank is determined based on the following equation:

$$P_{stop} = 1.26 \frac{\text{bar}}{^\circ\text{C.}} \cdot T_{Vehicle} + 330.9 \text{ bar}$$

The equation is derived from information of thermodynamic properties of hydrogen and of pressure category. Hence only unknown variable needed to determine a stop pressure is the vehicle tank temperature.

The equation is advantages even though it is not exact for all temperatures, however it is found that the resulting pressure stop criteria are sufficient to use as basis for terminating the refueling process. The alternative, i.e. more precise pressure stop criteria can be calculate, however these calculations require more power from a data processors. However, in an embodiment, the data set of the predefined table can be more precise if calculations are made based on more complex equations.

According to an embodiment of the invention, the pressure stop criterion of the at least one pressure category is calculated for a plurality of vehicle tank temperatures in the range of minus 40° C. to plus 90° C.

It is advantageous to prepare the table (also sometimes referred to as a database) with relationships (also sometimes referred to as data set) between vehicle tank temperature and pressure stop criterion in that no calculations are needed during the refueling process thereby is obtained a reduced load on the station controller.

Preferably a pressure stop criterion is calculated for each integer in the range, but several pressures stop criteria may be calculated between each integer in the range. Further, it should be mentioned that a pressure stop criterion can also be calculated only for every second or every third integer in the range depending on the required precision in termination of the refueling process.

According to an embodiment of the invention, wherein during a first period of the refueling process, the controller establishing the pressures stop criterion from a lookup in the predefined table based on the measured temperature of gas in the vehicle tank, and wherein during a remaining period of the refueling process, the controller is calculating the pressure stop criterion based on the measured pressure of the gas inside the vehicle tank, the measured temperature of the gas inside the vehicle tank and the pressure category of the vehicle tank.

According to an embodiment of the invention, the end of the first period is reached when the measured pressure of the gas inside the vehicle tank is 50% of the pressure stop criterion, preferably 80% of the pressure stop criterion, most preferably 90% of the pressure stop criterion.

This is advantageous in that then during the first period of the refueling process the controller uses a fast approach (the table based approach) to determine if the refueling process has to terminate. During this first part of the refueling process in almost any case the pressure of the gas in the vehicle tank is far from the pressure stop criterion, hence it is of less importance if the approach of determining the pressure of the gas in the vehicle tank is not completely precise.

However, during the remaining period of the refueling process i.e. towards the end of the refueling process when the pressure of the gas in the vehicle tank approaches the pressure stop criterion, a more precise determination may be preferred to calculate the pressure stop criterion. This is because the closer the pressure of the gas in the vehicle tank is to the stop pressure criterion the more likely it is that the controller terminates the refueling process based hereon. Hence to terminate the refueling process as precise as possible to the pressure stop criterion the termination of the last (remaining) part of the refueling process is preferably controlled according to the calculation based approach.

According to an embodiment of the invention, the pressure of the gas inside the vehicle tank is monitored based on information provided by a pressure sensor of the vehicle and/or a pressure sensor of the hydrogen refueling station.

Monitoring the pressure of the gas in the vehicle tank based on a pressure sensors or other sensors at the hydrogen refueling station is advantageous in that only one signal is then needed from the vehicle i.e. the gas temperature signal. Measurement signals from the vehicle is not verified and therefore not 100% trustworthy and there is a risk that the data communication fails to provide data from the vehicle to the hydrogen refueling station. Therefore, it is advantageous to use measurements from the hydrogen refueling station to verify the vehicle pressure measurements or solely base control including pressure of hydrogen to the vehicle on pressure measurements made at the hydrogen refueling station.

A further advantage of using a pressure sensor at the hydrogen refueling station is that changes of pressures then is available to the controller at every program scan. According to an embodiment of the invention the program (software code based on which the controller controls the refueling process) is scanned at a frequency of 100 Hz and the measurements from vehicle pressure sensor is updated at a frequency of 10 Hz. Hence, by using the pressure sensor at the hydrogen refueling station the pressure measurements are updated 10 times faster than if the pressure sensor at the vehicle is used. This is leading to the same advantages mentioned in relation of speed/safety as described above.

According to an embodiment of the invention, wherein during a final period of the refueling process, the controller is being configured to reduce the flow of hydrogen in the hydrogen supply line.

According to an embodiment of the invention, the final period starts when the pressure of the gas inside the vehicle tank is 75% of the pressure stop criterion, preferably 85% of the pressure stop criterion, most preferably 95% of the pressure stop criterion.

This is advantageous, especially in the situation where the pressure of the gas in the vehicle tank is established by a sensor (preferably pressure sensor) at the hydrogen refueling station. This is because the measurements of e.g. a pressure sensor is effected by speed of the flow i.e. at low speed flow the measurements of a pressure sensor is closer to the actual flow than when the speed of the flow is high. Again, as described above, during a first part of the refueling process the precision of the measurements/establishing of the is less important. At the remaining or final part of the refueling process on the other hand, to terminate the refueling process as close to the pressure stop criterion as possible the measurement/establishing is required to be as precise as possible. Accordingly, it is advantageous to reduce the flow in the hydrogen supply line to increase precision of measurements of pressure (both in vehicle and at hydrogen refueling station).

According to an embodiment of the invention, the controller establishes a pressure stop criterion for the refueling process continuously during the refueling process based on a pressure category of the vehicle tank and the monitored temperature of the gas inside the vehicle tank.

According to an embodiment of the invention, by the controller comparing the monitored current pressure of the gas inside the vehicle tank with the currently established pressure stop criterion and terminating the refueling process when the monitored pressure of the gas inside the vehicle tank has reached the pressure stop criterion.

According to an embodiment of the invention, the pressure of the gas inside the vehicle tank is corrected if a pressure drop is detected and wherein the corrected measure pressure is used by the controller for comparing the monitored corrected pressure of the gas inside the vehicle tank with the pressure stop criterion and terminating the refueling process when the monitored and corrected pressure of the gas inside the vehicle tank has reached the pressure current stop criterion.

BRIEF DESCRIPTION OF THE DRAWINGS

In the following, a few exemplary embodiments of the invention are described with reference to the figures, of which

DETAILED DESCRIPTION

Figure 1:
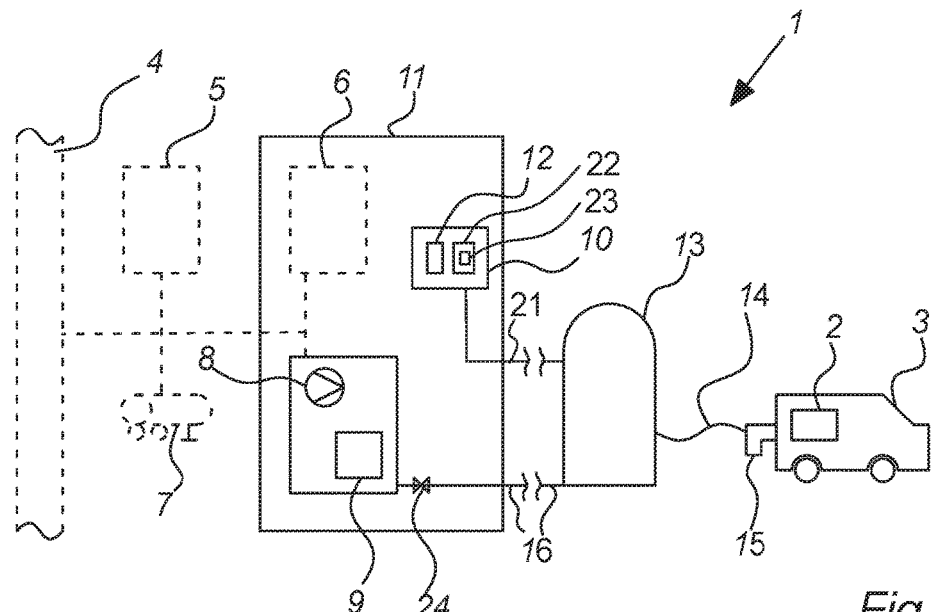
FIG. 1 illustrates a hydrogen refueling station fluidly connected to a vehicle.

FIG. 1 illustrates a schematic view of a hydrogen refueling station (HRS; Hydrogen Refueling Station) 1 according to an embodiment of invention. The HRS 1 supplies hydrogen to a receiving tank 2 of a vehicle 3 from a hydrogen supply in the form of a supply network 4, external hydrogen storage 5, internal hydrogen storage 6 and/or a temporary hydrogen storage 7.

To regulate the hydrogen pressure, temperature, flow, time etc. e.g. to comply with currents standards such as e.g. the SAE J2601 standard for refueling of a vehicle tank 2 with hydrogen, the HRS 1 comprises a compressor 8, a cooling system 9 and a control and monitoring system 10 all which are preferably located within an enclosure 11 of the HRS 1 or of a dispenser 13.

A refueling process involves several states, one of which may be moving from a "standby state" to a "pre-refueling/refueling start state" upon activation of a the controller 12 e.g. when a refueling is requested by a user. Such request is typically initiated by the user, who is directly or indirectly activating a controller 12. Activation of the controller 12 may be established when the user removes the nozzle 15 from the nozzle holder at the HRS 1 or dispenser 13 for attaching it to the vehicle 3, interacting with a user interface of the HRS 1 or dispenser 13 or the like.

At most locations of HRS 1 it is preferred to physically separate the HRS enclosure 11 from a dispenser 13. The dispenser 13 is connectable to the vehicle 3 by means of a hose 14 and a nozzle 15 (hydrogen outlet). In such embodiment, the HRS enclosure 11 and the dispenser 13 is connected by one or more supply lines 16 for supplying hydrogen from the HRS 1 via the dispenser 13 to the receiving tank 2 of the vehicle 3.

Even though the HRS 1 illustrated on FIG. 1 is illustrated to comprise enclosure 11 and dispenser 13 separated and connected with a supply line 16 it should be mentioned that the components of the HRS 1 from hydrogen supply 4, 5, 6, 7 to the hydrogen outlet which in FIG. 1 is illustrate as a nozzle 15 and everything (valves, transducers, actuators, i.e. all components used for controlling the hydrogen flow) in the hydrogen flow path between, may be integrated completely in one enclosure or as illustrated in FIG. 1 installed as one or more individual components. A representation of one or more valves used for terminating the flow of hydrogen in the supply line 16 is illustrated as the valve 24.

The illustrated principal components of the control and monitoring system 10 comprises a controller 12, a data memory 22 communicatively coupled to the controller 12, a valve 23 controlled by the controller and a pressure sensor 20. The control and monitoring system 10 may of course include other hardware components, the hardware topology or memory and controller may vary depending on design choices of the communication between the principal components and may be adapted to comply with the intended purpose.

The refueling process described in this document is used for filling a storage tank 2, such as that of a hydrogen powered vehicle 3, with hydrogen fuel, preferably in its gaseous state. The refueling process is executed by the hydrogen refueling station 1 and dispenser 13. The refueling process is performed according to regulations provided by the SAE J2601 standard. This standard specifies the density for two major pressure categories at 100% state of charge (SOC; State Of Charge) i.e. when according to SAE J2601, the receiving tank 2 is full. Accordingly, the density for a full receiving tank of a 350 bar pressure category is a density of 24.0 g/L and for a tank of a 700 bar pressure category is a density of 40.2 g/L.

The present invention describes a refueling process implementing a tank filling process suitable for any pressure category and which is based on lookups in a predetermined table 23 holding a plurality data set/relationships between measured temperatures of gas in the tank 2 and pressure stop criteria. Hence based on a measure temperature of gas in the tank Tvehicle a predefined pressure stop criterion Pstop can be found. The refueling process can then be terminated based on a comparison between a measured pressure of the gas in the tank Pvehicle and the predefined pressure stop criterion Pstop.

According to another embodiment, the refueling process will use the table based approach for determining the pressure stop criterion Pstop during a first part of the refueling process and a real-time calculation of pressure stop criterion Pstop during a remaining part of the refueling process.

The embodiments of the present invention, is advantageous in that they do not need to determining the actual density of the hydrogen gas within the tank 2 to determine the stop criterion for ensuring that the tank 2 is not over fueled. According to the SAE J2601 standard, the definition of over fueling is above 120% SOC and flow of hydrogen gas to the vehicle tank 2 has to be stopped within seconds from observing 100% SOC e.g. by closing a valve 24 in the supply line 16.

Figure 2:
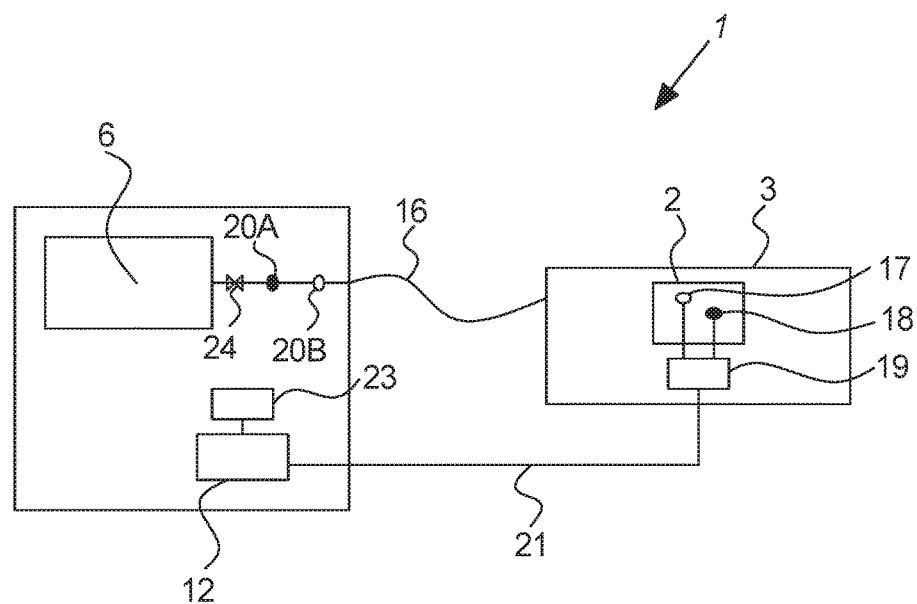
FIG. 2 illustrates a vehicle communicating with a controller.

FIG. 2 illustrates a vehicle 3 having a tank 2. The vehicle tank pressure Pvehicle is measured by a pressure sensor 17 and the vehicle tank temperature Tvehicle is measured by a temperature sensor 18. At FIG. 2 the sensors 17, 18 are illustrated to communicate with the controller 12 via a vehicle controller 19. However, the sensors 17, 18 may communicate directly with the controller 12.

FIG. 2 also illustrates station pressure sensors 20. According to an embodiment of the invention, there are two station pressure sensors 20A, 20B located to measure pressure at substantially the same point in the hydrogen supply line 16. The redundancy in the stations pressure sensors obtained by having two sensors are advantageous. The location of the pressure sensors 20 is preferably as close to the nozzle 15 as possible i.e. inside the center module 11 of the HRS/dispenser 13 as close to the point where a flexible hose 14 is connected hereto.

Also on FIG. 2 the communication between vehicle 3 and HRS 1 is illustrated as a wired communication channel 21, however any kind of suitable wireless data communication can be used for this communication.

A refueling of a vehicle tank 2 should preferably stop at 100% SOC or at least termination of the refueling should be initiated when 100% SOC is reached. The refueling is allowed to stop before 100% SOC is reached, however then the vehicle tank 2 would be able to contain more hydrogen gas.

The ratio of compressed hydrogen storage system (CHSS; Compressed Hydrogen Storage System) hydrogen density to the density at nominal working pressure (NWP; Nominal Working Pressure) rated at the standard temperature of 15° C. SOC is expressed as a percentage and is computed based on the gas density per equation 1 according to SAE J2601.

$$SOC(\%) = \frac{\rho(P, T)}{\rho(NWP, 15° C.)} \times 100 \quad [EQ1]$$

The disclosure seeks to avoid over fueling of the vehicle tank by fast and precise determining a pressure stop criterion without any calculations made during the refueling process. Hence, no particular requirements to the controller 12 is required from determining pressure stop criterion.

Figure 3:
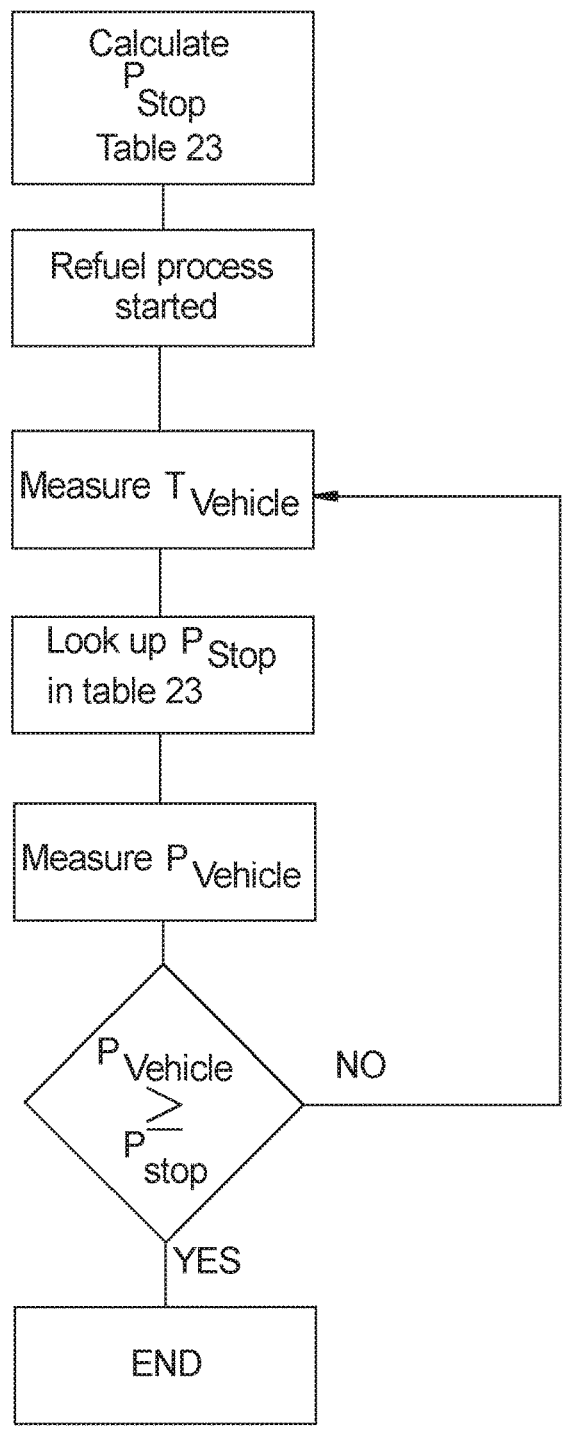
FIG. 3 illustrates a first flow chart for determining the pressure stop criterion.

FIG. 3 illustrates a flow chart for determining a stop criterion according to an embodiment of the invention.

The method illustrated in FIG. 3 involves monitoring vehicle tank temperature $T_{vehicle}$ and pressure $P_{vehicle}$, and comparing these to data set of the predefined table 23 to determine a refueling pressure stop criterion $P_{stop}$.

The refueling pressure stop criterion is created from considerations of thermodynamic properties of hydrogen and knowledge of the pressure category of the tank 2 to be refueled. Hence for a vehicle 3 having a tank 2 of a 700 bar pressure category, the pressure stop criterion Pstop can be approximated by the following best fit function:

$$P_{stop} = 2.5 \frac{bar}{° C.} \cdot T_{Vehicle} + 661.6 \text{ bar} \quad [EQ2]$$

For a tank 2 of a 350 bar pressure category, the pressure stop criterion Pstop can be approximated by the following best fit function:

$$P_{stop} = 1.26 \frac{bar}{° C.} \cdot T_{Vehicle} + 330.9 \text{ bar} \quad [EQ3]$$

Where Pstop is the pressure stop criterion i.e. stop pressure at which the refueling process should terminate and 330.9/661.6 bar and 1.26/2.5 bar/° C. are fit constants found to be suitable to arrive at an acceptable pressure stop criterion Pstop. The fit constants are physical properties of hydrogen available e.g. from National Institute of Standards and Technology (NIST) webpage.

The relations of EQ2 and EQ3 are defined for temperatures between −40° C. and 85° C., and pressure levels between 1 bar and 1000 bar. Thereby EQ2 and EQ3 is only precise within these intervals of pressure and temperature.

It should be noted that a higher order equation can also be made by which the pressure stop criterion Pstop can be calculated more precise and outside the above intervals. However, experiments have established that EQ2 and EQ3 are sufficiently precise i.e. less than an error of 1 bar.

The advantage of the approximated EQ2 and EQ3 compared to the more precise higher order equation is that Pstop can by calculated by EQ2 and EQ3 in one program scan performed by the processor/controller 12. Thereby requirements to the processor when creating the predefined table 23 may be reduced.

The reduction in calculation complexity is thus to a degree that the pressure stop criterion during refilling may be performed as a simple table-lookup within including calculation in relation to tank pressure during the refilling.

Moreover, the method according to an advantageous embodiment of the invention is much more robust to instable filling cycles due to error in measuring of pressure in the vehicle tank. Such pressure drops measured in the vehicle tank will thus not affect the refueling cycle due to the fact that the only variable parameter applied during the refueling is tank temperature which is a much more stable measure in real-life than measured tank pressure. Such runtime correction of measured pressure may be a simple interpolation occurring if a pressure drop is detected.

It is thus possible to apply the present method as a truer estimation of the stop pressure as pressure drops are not contaminating the running estimation of the stop criterion pressure and it is therefore possible by a simple considerations or interpolation of measured tank pressure to establish an estimated tank pressure value which may be used as a stop criterion with reference to the inventive table-lookup state of charge.

Now returning to FIG. 3, the first step according to this embodiment of the invention is to calculate a pressure stop criterion Pstop for a plurality of different temperatures at one or more pressure categories. At least pressure stop criteria Pstop has to be calculated for the pressure category of the tank to be filled by the HRS 1. The result of this first step could be a plurality of pressures stop criteria Pstop as illustrated in table 1 and 2 below where pressure category in bar is down the first column and the vehicle tank temperature Tvehicle for which a pressure stop criterion is calculated is in the upper row.

TABLE 2

| ° C. | bar | |
|---|---|---|
| | 350 | 700 |
| −45 | 273.4 | 547.7 |
| −40 | 279.9 | 560.6 |
| −35 | 286.3 | 573.4 |
| −30 | 292.7 | 586.2 |
| −25 | 299.1 | 598.9 |
| −20 | 305.5 | 611.6 |
| −15 | 311.9 | 624.3 |
| −10 | 318.2 | 637.0 |
| −5 | 324.6 | 649.7 |
| 0 | 331.0 | 662.3 |
| 5 | 337.3 | 674.9 |
| 10 | 343.7 | 687.5 |
| 15 | 350.0 | 700.0 |
| 20 | 356.3 | 712.5 |
| 25 | 362.7 | 725.0 |
| 30 | 369.0 | 737.5 |
| 35 | 375.3 | 749.9 |
| 40 | 381.6 | 762.4 |
| 45 | 387.9 | 774.8 |
| 50 | 394.2 | 787.2 |
| 55 | 400.5 | 799.5 |
| 60 | 406.8 | 811.9 |
| 65 | 413.0 | 824.2 |
| 70 | 419.3 | 836.5 |
| 75 | 425.6 | 848.8 |
| 80 | 431.8 | 861.0 |
| 85 | 438.1 | 873.3 |

TABLE 1

| °C. | bar | | |
|---|---|---|---|
| | 350 | 700 | ... |
| ... | Pn | Pn | ... |
| −32 | Pn | Pn | ... |
| −33 | P9 | P1 | ... |
| −30 | P10 | P2 | ... |
| −25 | P11 | P3 | ... |
| −20 | P12 | P4 | ... |
| ... | ... | ... | ... |
| 70 | P13 | P5 | ... |
| 75 | P14 | P6 | ... |
| 80 | P15 | P7 | ... |
| 85 | P16 | P8 | ... |
| 87 | Pn | Pn | ... |
| ... | ... | ... | ... |

The content of table 1 and 2 is predefined i.e. the tables are created prior to beginning a refueling even it may be created prior to the commissioning of the HRS as illustrated in FIG. 3. Experiments has shown that intervals of 5° C. is sufficient for calculating useful pressure stop criteria of the different pressure categories. However, as indicated in illustrative table 1 other intervals can be used, preferably towards the ends of the temperature scale.

A table as referred to in this document is preferably a description for a general arrangement of discrete data points structured in rows and columns, to provide overview of a relation with one or more depending variables. Tables are often used for comparing of relating measurements. Hence data related to e.g. a measurement can be found from the table. Typically, between two adjacent discrete data points of a table interpolation is used to find data points between data points of the table. Hence, when a measurement lies between said data points of the table, interpolation can be used to find the data relating to the measurement. With reference to table 2, if a temperature measurement is 13° C. interpolation between the stop pressure at 10° C. and 15° C. can be used to find the stop pressure at 13° C. Tables can be 2 or multidimensional in nature and located on data memory of controller or on a data storage connected to the controller.

The refueling is stated when the controller 12 is activated in one way or the other. Typically, the activation is made when a person (a user) is to refuel a vehicle tank 3 and interacts with a payment module, info screen, removes the nozzle 15 from the nozzle holder, etc. Also, wireless technology can be used to activate the controller 12. When the controller is activated, the refueling process starts.

The refueling process includes initiating flow of hydrogen from hydrogen storage to vehicle tank 2 in compliance with SAE J2601. This is done by opening one or more valves represented by valve 24. Accordingly, the controller 12 controls an average ramp rate of flow of hydrogen which is kept within temperature and pressure limits.

When the refueling process is stated the temperature of gas in the vehicle tank Tvehicle is measured (preferably by the temperature sensor 18) and provided to the controller 12.

Based on the measured temperature Tvehicle, the controller 12 look up a pressure stop criterion Pstop for that particular temperature in the predefined table 23, at the pressure category of the vehicle tank 2.

The pressure stop criterion P1-Pn retrieved from the predefined table 23 is then compared to the measured vehicle pressure Pvehicle. If the vehicle tank pressure Pvehicle is higher than or equal to the stop pressure Pstop, then the refueling is terminated.

If not, new value of pressure stop criterion Pstop is looked up in the table 23 based on the latest measured temperature of gas in the tank Tvehicle available to the controller 12.

A new comparison is made between vehicle pressure Pvehicle and pressure stop criterion Pstop. This is continued until Pvehicle is equal to or higher than Pstop.

The method illustrated and described in relation to FIG. 3 is advantageous in that calculations of pressure stop criterion Pstop are made prior to the refueling which reduces load of the processor/controller 12 during the refueling process and further it is possible to verify the calculation before they are used in real time.

Figure 4:
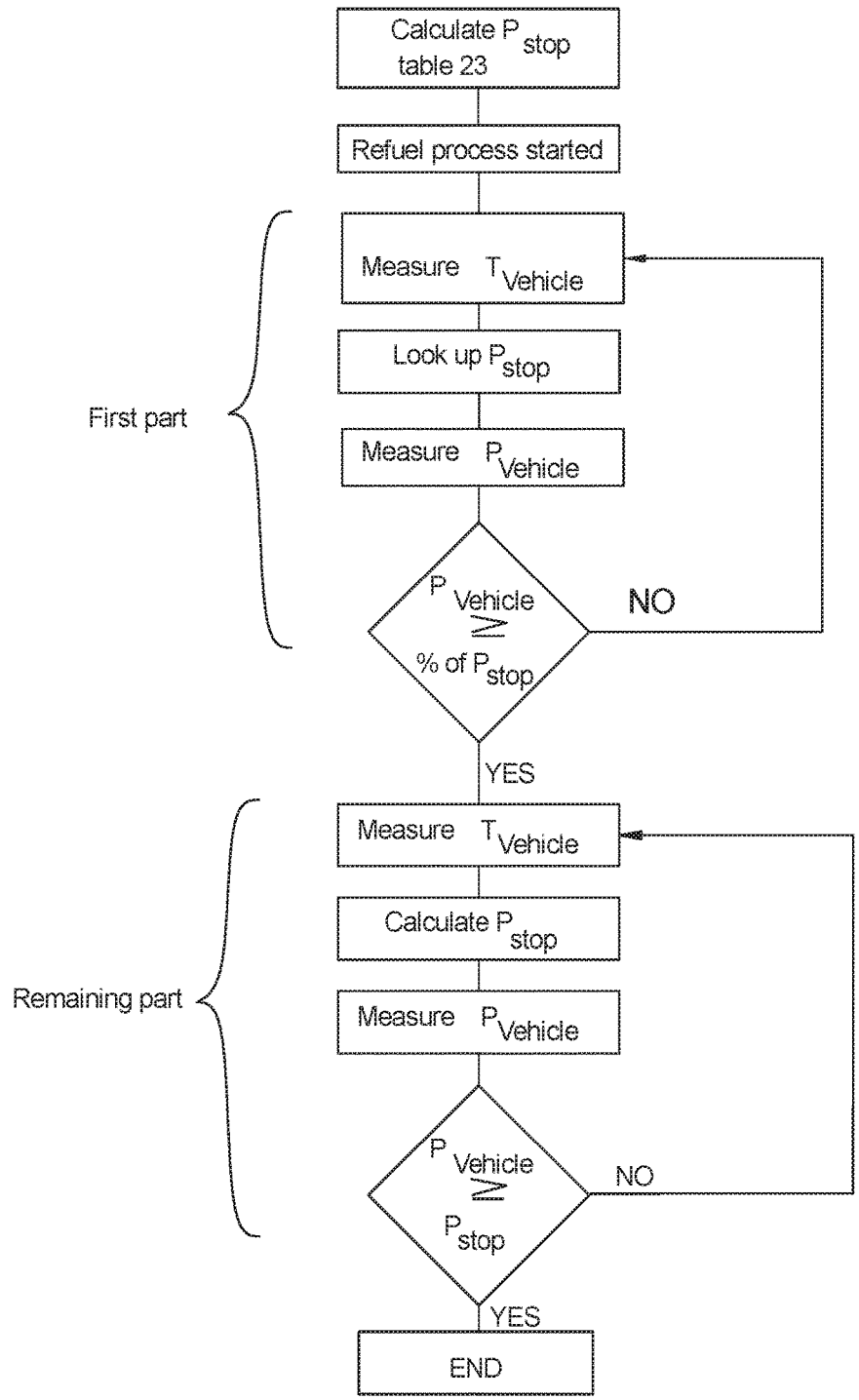
FIG. 4 illustrates a second flow chart for determining the pressure stop criterion.

FIG. 4 illustrates an embodiment of the invention, where the predefined table approach is used for determining pressure stop criterion Pstop for a first part of the refueling process and a real-time calculation of pressure stop criterion Pstop is used for determining the pressure stop criterion Pstop for a remaining part of the refueling process.

The flow chart of FIG. 4 is similar to the flow chart of FIG. 3 with regards to the first part. However, the condition for moving on in the execution of the program controlling the refueling process is here if the measured pressure Pvehicle is equal to or higher than a percentage of the pressure stop criterion Pstop found in the table 23.

If the measured pressure Pvehicle is equal to or higher than a percentage of the pressure stop criterion Pstop the remaining part of the program controlling the refueling process is executed. The percentage can be between 75% and 99% preferably around 90%.

In the remaining part, the vehicle tank temperature Tvehicle is still measured by temperature sensor 18 and provided to the controller 12.

At the controller 12 the pressure stop criterion Pstop is calculated based on EQ2, EQ3 or others depending on the pressure category.

The vehicle pressure Pvehicle is then measured and if the vehicle tank pressure Pvehicle is higher than or equal to the pressure stop criterion Pstop, then the refueling is terminated.

If not, the vehicle tank temperature Tvehicle is measured again. A new value of pressure stop criterion Pstop is calculated and compared to a new measured vehicle tank pressure Pvehicle.

The reason why it is advantageous to calculate the pressure stop criterion Pstop is that it is dependent on the temperature of the vehicle tank Tvehicle. This temperature changes with pressure increase/decrease/flow and therefore a new pressure stop criterion is calculated as the vehicle tank temperature changes.

It should be mentioned, that vehicle tank pressure and temperature Pvehicle, Tvehicle can be measured at the same time, but that vehicle pressure Pvehicle is first used after calculating of stop criterion Pstop.

The relation of EQ2 and EQ3 is used in a monitor function of the controller 12 that may be updated continuously or iteratively during a refueling process. Preferably for each calculation/update of the Pstop value, a comparison is made to check if Pvehicle is equal to or larger than Pstop.

As mentioned, the refueling is terminated if the Pvehicle is equal to or higher than Pstop. The pressure stop criterion can also be defined by an interval around the established Pstop value. Typically, such range is larger below Pstop than above Pstop in that typically Pstop is the maximum allowed pressure and therefore in theory it is not possible to establish an upper limit above Pstop. However, due to latency in the control system, from Pstop is reached to a valve 24 is completely closed, time elapses. During this time the pressure in the vehicle tank Pvehicle is increased over Pstop. Also, it should be mentioned that it is within the scope of the invention to use the described method and terminating the refueling at a value of Pvehicle which is below the value of Pstop.

The determination of pressure stop criteria described in relation to FIGS. 3 and 4 are both based on knowledge of pressure category of the vehicle tank 2. This knowledge is either obtained by mechanical means, by visual recognition, communicated from the vehicle controller 19 or the like, hence even though not illustrated or described the pressure category needs to be determined. The reason why the step is not described is that the HRS and vehicle mechanically is designed to fit and thereby only on pressure category may exist. Example of mechanical means/design for determine pressure category includes a match between nozzle and vehicle receptacle i.e. if nozzle matches receptacle, the controller 12 knows that the vehicle tank is e.g. 700 bar. If the vehicle is configured for communicating and the HRS is configured for receiving this information, then communication of this information is preferably a step of the refueling procedure.

As one can imagen, the table base approach described in relation to FIG. 3 is faster/requires less processor capacity compared to the calculation approach described in relation to FIG. 4. On the other hand, it is evident, that the resolution of the stop criteria are higher (going towards infinite) than the resolution of the table based approach which is fixed to the number of predetermined calculation leading to a less precise establishing of Pstop.

The resolution and thereby the precision of the table based approach is as high as the "distance" between the temperatures at which a pressure stop criterion Pstop is calculated. Accordingly, the larger table, the higher resolution hence at a point the table may become so big that switching to the calculation based approach becomes relevant at least for a remaining part of the refueling process.

Before switching to the calculation based approach, interpolation of points of the table can be considered. Hence interpolation of pressure stop criteria Pstop from the table based approach can be used as a hybrid between table and calculation based approaches.

The refueling procedure can according to the invention be optimized to be as fast/less processor capacity demanding as possible or optimized to be as precise as possible.

Using the table based approach, reduces the precision of the pressure stop criterion Pstop i.e. the refueling process may be stopped at a pressure stop criterion Pstop determined from the table which is not corresponding to the actual pressure of the vehicle tank. This will lead to a slightly (depending on table resolution) higher or lower pressure in the vehicle tank 2 than expected from the pressure stop criterion. However, the stop criterion can be established faster and with less resources from the PLC which is advantages in that safety issues can be addressed faster and PLCs with less processor capacity and thereby cheaper can be used.

Further, in relation to safety the faster a potential error or stop criterion is detected the faster the HRS can stop the refueling process. This is advantages in that the effect on an error can be reduced and the refueling procedure can be stopped as fast as possible after reaching the pressure stop criterion thereby reducing the risk of continue refueling over the pressure stop criterion.

Further, a higher number of table look ups to define a stop criterion may be made compared to the number of calculated stop criterion made within the same time period.

Further, the table base approach is advantages in that the raw measure data is used as basis for lookup in the table 23 hence no errors in any calculations can have effect on the determined pressure stop criterion Pstop in that the content of the table 23 can be verified prior to starting the refueling process.

Using the calculation based approach at the remaining part of the refueling process increases the precision of the calculation of pressure stop criterion to the same level as the precision of the measured data. This will in this remaining part of the refueling process lead to a pressure in the vehicle tank Pvehicle when the stop criterion Pstop is reached which is more precise to the calculated stop pressure. Such more precise calculation requires more resources from the data processors of the PLC which therefore needs to be more power full to avoid that calculation time and thereby safety will be compromised.

It is also possible to use apply a table-lookup approach according to the provisions of the invention for a part of the refueling process and then use the more processor requiring calculation at the end of the refueling process.

The controller 12 is therefore according to an embodiment able to select a refueling procedure which is optimized either to speed (faster/less requirements to processor) or to precision (slow/high requirements to processor).

When initiating the refueling process, the user may decide optimization criterion. Alternatively, the controller 12 may start the refueling process optimized to speed and towards the end of the refueling process switch to precision optimized refueling to ensure ending it as close to the stop criterion as possible i.e. as close to the stop pressure as possible as described in relation to FIGS. 3 and 4.

The pressure stop criterion cannot be more precise than the measurements of the vehicle pressure and temperature. Pressure and temperature measurements provided by vehicle sensors 17, 18 are very hard to verify. Therefore, in relation to pressure, the HRS includes pressure sensors 20 which can be used to verify the received pressure from the vehicle. Hence if the station pressure sensor 20 measures the same as the vehicle pressure sensor 17 e.g. within a given tolerance/compensation added to account for the flow at the position of the sensors 20, the received pressure measurement is considered valid and can be used.

Alternatively, the pressure measurements from the vehicle (if any) can be omitted by using at least one of the two pressure sensors 20a, 20b of the station 1. However, the pressure of these sensors 20 has a tendency to display a higher pressure than the pressure sensor 17 of the vehicle. Despite this disadvantages, the pressure sensors 20 are advantage to use in that they are available all the time. Hence if the controller 12 scans the code every 10 ms the comparison of the vehicle pressure to stop pressure is made every 10 ms with a new vehicle pressure value each time.

If pressure is measured from the vehicle pressure sensor 17, according to the SAE J2799 standard the value is only updated every 100 ms thereby in worst case 90 ms may pass from a stop criterion is complied with to the controller 12 actually initiates the stop procedure.

To account then for the lower precision of station transmitters compared to vehicle transmitter, the flow of hydrogen and pressure drop in hose 14 (the main reasons for not trusting the pressure sensors at the station) during the refueling may be reduced towards the end of the refueling. Hence when station pressure is e.g. 90% of stop pressure, then the flow may be reduced and a more precise measurement (to the actual pressure in the vehicle tank) from the station pressure sensors 20 can be obtained. The flow can be reduced at any time at the refueling process but preferably at the end of the refueling e.g. the last 50%, 75%, 85% or 90%. The percentages can be of real-time measured pressure, mass flow or the like compared to what is expected as a stop criterion for the refueling process.

Figure 5:
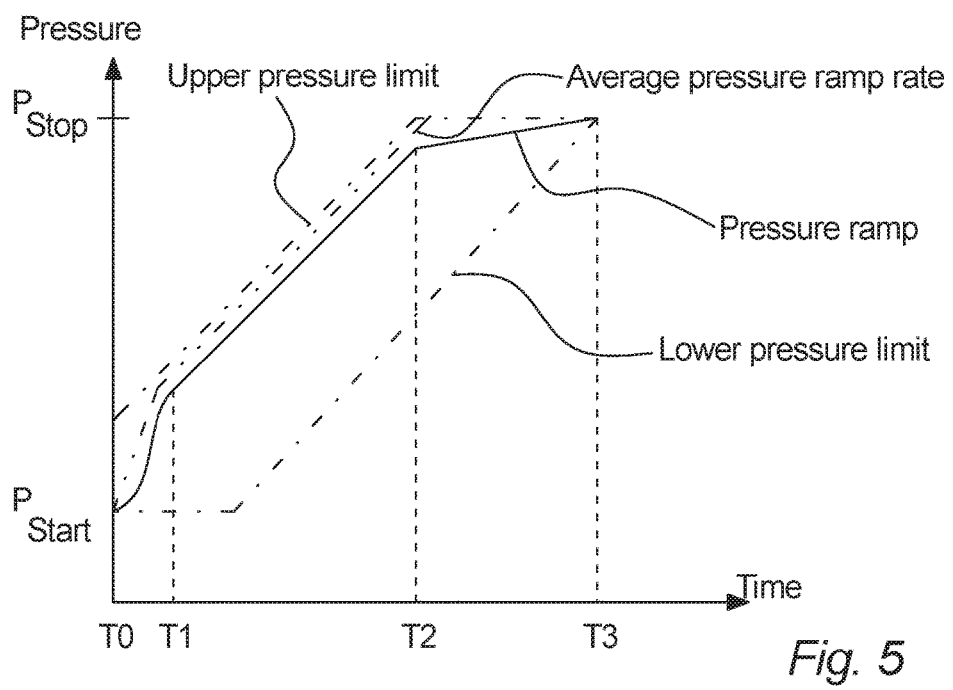
FIG. 5 illustrates a pressure ramp of a refueling process.

This is illustrated in FIG. 5 where the flow of hydrogen in the hydrogen supply line 16 (also referred to as pressure ramp) is illustrated following an average pressure ramp rate or simply ramp rate. According to SAE J2601, the flow in the supply line has to stay within an upper pressure limit and a lower pressure limit. These limits are clearly defined by SAE J2601 as 70 MPa above the average pressure ramp rate for the upper limit and 25 MPs below the average pressure ramp rate for the lower limit. The average pressure ramp rate is determined from a set of start conditions which are all specified in SAE J2601. The illustrated average pressure ramp rate is just an example of the pressure advantageous to follow during a refueling with the upper/lower limits specified in the SAE J2601.

The refueling process starts at a pressure Pstart at time T0. Between time T0 and T1 the pressure and thereby the flow is increased and the pressure ramp is close to the upper limit to reduce the time for refueling. Between time T1 and T2 the flow/pressure is constant and according to known refueling processes the pressure ramp would continue this linear development until it reaches pressure stop criterion Pstop.

As explained, to improve the accuracy of the pressure measurements at the hydrogen refueling station 1 but also at the vehicle, the flow can be reduced as can be seen at time T2 where the pressure ramp bends. In the period between T2 and T3, the slope of the pressure ramp is reduced indicating a reduced flow and thereby a more precise measurement of pressure at the hydrogen refueling station/vehicle can be obtained. If time however is more important than precise pressure measurements, the pressure ramp is controlled to continued its linearity until it reaches Pstop as illustrated by the dotted line.

The pressure ramp is controlled to follow the average pressure ramp rate. This is done by controlling valve 24 located upstream the pressure sensor 20 based on measurements of one of the station and/or vehicle pressure sensors.

Preferably, the pressure stop criterion is compared to the vehicle pressure Pvehicle measured by vehicle pressure sensor 17. This is because the pressure measured at the station pressure sensor 20 is higher than the actual pressure of the tank in that the hose 14 and hydrogen flow path in the vehicle is introducing a reduction of pressure. The pressure reduction occurring in the vehicle is unknown however, it can be estimated if needed. Hence a pressure reduction factor can be multiplied to the measurements from the station sensor 20 to get this closer to the actual tank pressure if needed.

The station sensor 20 can be used to terminate the refueling in case the pressure measurements are from vehicle is missing or the calculation of pressure stop criterion fails. If calculation fails and/or vehicle pressure is missing the refueling process is terminated with target pressure for the given type of refueling found in SAE J2601 is reached.

The temperature however cannot be measured or estimated very accurate to the actual temperature of the vehicle tank at the HRS. It is for this reason that the SAE J2601 is created to be a sure that temperature do not change to a critical high/low level.

By using the relationships provided by the SEA J2601 standard together with temperature and/or pressure measured or in any way established at station and/or vehicle as basis for the refueling process, the refueling process does not perform any calculation at all to determine any tank density for any part of the filling process. The use of the look-up table and thermodynamic properties of hydrogen (via EQ2 and EQ3) allows to use the pressure and temperature for determining a pressure stop criterion and thereby, when the refueling process is complete.

It should be mentioned that after termination of the refueling process the density of the hydrogen gas in the vehicle tank 2 can be calculated if need for information or billing.

The figures are only meant to illustrate embodiments of the invention hence the implementation and design of the HRS and vehicle may vary and still be within the scope of the claims below. In an advantageous embodiment of the invention a fleet of vehicles with tank of different pressure categories may be refueled.

When referring to pressure or temperature inside the vehicle tank a reference is made to values based on which these pressure or temperatures can be established not only direct measurements made inside the vehicle tank. Hence, the pressure and temperature can also be established by measurements made outside the vehicle tank 2, in this case a correction factor may be needed to use measurements from outside the vehicle tank to represent measurements made inside the tank 2.

The invention claimed is:

1. A method of refueling a tank of a vehicle with hydrogen controlled by a controller of a hydrogen refueling station, the method comprising the steps of:
    connecting the vehicle to the hydrogen refueling station by means of a hose,
    initiating a refueling process by activating the controller,
    during the refueling process, monitoring a temperature of gas inside the vehicle tank,
    the controller establishing a pressure stop criterion for the refueling process, based on a pressure category of the vehicle tank and the monitored temperature of the gas of the vehicle tank,
    the establishing of the pressure stop criterion being based on a lookup in a predefined table of a plurality of pressure stop criterions,
    during the refueling process, monitoring a pressure of the gas inside the vehicle tank,
    by the controller, comparing the monitored pressure of the gas inside the vehicle tank with the pressure stop criterion and terminating the refueling process when the monitored pressure of the gas inside the vehicle tank has reached the pressure stop criterion, and
    disconnecting the hose between vehicle and the hydrogen refueling station;
    wherein the pressure stop criterion for a 700 bar vehicle tank is determined based on the following equation:

$$P_{stop} = 2.5 \frac{\text{bar}}{°C.} \cdot T_{Vehicle} + 661.6 \text{ bar}.$$

2. The method of refueling a vehicle tank according to claim 1, wherein the controller is activated by at least one of the list comprising: approaching vehicle, activation of user interface and initiating payment.

3. The method of refueling a vehicle tank according to claim 1, wherein the pressure category for the vehicle tank to be refueled is determined prior to activation of the controller.

4. The method of refueling a vehicle tank according to claim 1,
wherein information of vehicle tank gas temperature and vehicle tank gas pressure is provided to the controller at least every third second.

5. The method of refueling a vehicle tank according to claim 1, wherein density of the hydrogen in the vehicle tank is calculated based on information of vehicle tank temperature and vehicle tank pressure obtained after termination of the refueling process.

6. The method of refueling a vehicle tank according to claim 1, wherein the predefined table for at least one pressure category comprising a plurality of datasets, each dataset comprising a gas temperature with a corresponding pressure stop criterion.

7. A method of refueling a vehicle tank according to claim 1, wherein the pressure stop criterion of the at least one pressure category is calculated for a plurality of vehicle tank temperatures in the range of minus 40° C. to plus 90° C.

8. The method of refueling a vehicle tank according to claim 1,
wherein during a first period of the refueling process, the controller establishes the pressures stop criterion from a lookup in the predefined table based on the measured temperature of gas in the vehicle tank, and wherein during a remaining period of the refueling process, the controller is calculating the pressure stop criterion based on the measured pressure of the gas inside the vehicle tank, the measured temperature of the gas inside the vehicle tank and the pressure category of the vehicle tank.

9. The method of refueling a vehicle tank according to claim 8,
wherein an end of the first period is reached when the measured pressure of the gas inside the vehicle tank is 50% of the pressure stop criterion.

10. The method of refueling a vehicle tank according to claim 1, wherein the pressure of the gas inside the vehicle tank is monitored based on information provided by a pressure sensor of the vehicle and/or a pressure sensor of the hydrogen refueling station.

11. The method of refueling a vehicle tank according to claim 1, wherein during a final period of the refueling process, the controller is being configured to reduce the flow of hydrogen in the hydrogen supply line.

12. The method of refueling a vehicle tank according to claim 11, wherein the final period starts when the pressure of the gas inside the vehicle tank is 75% of the pressure stop criterion.

13. The method of refueling a vehicle tank according to claim 1, wherein the controller establishes a pressure stop criterion for the refueling process continuously during the refueling process based on a pressure category of the vehicle tank and the monitored temperature of the gas inside the vehicle tank.

14. The method of refueling a vehicle tank according to claim 1,
wherein the pressure of the gas inside the vehicle tank is corrected if a pressure drop is detected and wherein the controller compares the corrected pressure of the gas inside the vehicle tank with the pressure stop criterion and terminates the refueling process when the corrected pressure of the gas inside the vehicle tank has reached the pressure current stop criterion.

15. The method of refueling a vehicle tank according to claim 1,
wherein the establishing of the pressure stop criterion is based on a lookup in a predefined table of a plurality of pressure stop criterions, wherein the predefined table of the plurality of pressure stop criterions is generated prior to initiating the refueling process.

16. The method of refueling a vehicle tank according to claim 1,
wherein the establishing of the pressure stop criterion is based on a lookup in a predefined table of a plurality of pressure stop criterions, wherein the predefined table of the plurality of pressure stop criterions is generated prior to initiating the refueling process, and is stored in a memory communicatively connected to the controller.

17. A method of refueling a tank of a vehicle with hydrogen controlled by a controller of a hydrogen refueling station, the method comprising the steps of:
connecting the vehicle to the hydrogen refueling station by means of a hose,
initiating the refueling process by activating the controller,
during the refueling process monitoring the temperature of the gas inside the vehicle tank,
the controller establishing a pressure stop criterion for the refueling process, based on a pressure category of the vehicle tank and the monitored temperature of the gas the vehicle tank,
the establishing of the pressure stop criterion being based on a lookup in a predefined table of a plurality of pressure stop criterion,
during the refueling process monitoring the pressure of the gas inside the vehicle tank,
by the controller comparing the monitored pressure of the gas inside the vehicle tank with the pressure stop criterion and terminating the refueling process when the monitored pressure of the gas inside the vehicle tank has reached the pressure stop criterion, and
disconnecting the hose between vehicle and the hydrogen refueling station
wherein the pressure stop criterion for a 350 bar vehicle tank is determined based on the following equation:

$$P_{stop} = 1.26 \frac{\text{bar}}{°C.} \cdot T_{Vehicle} + 330.9 \text{ bar.}$$

* * * * *